Figure 1:
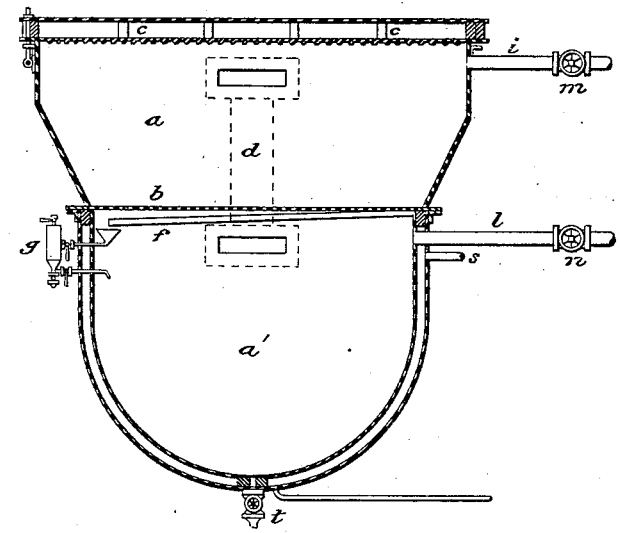

(No Model.)

E. B. HART.
EXTRACTING BY VOLATILE SOLVENTS SOLUBLE MATTER FROM SUBSTANCES CONTAINING IT, AND APPARATUS THEREFOR.

No. 253,379.            Patented Feb. 7, 1882.

WITNESSES:
E. B. Bolton
Geo. Bainton

INVENTOR:
Edward B. Hart,
By his Attorneys,
Burke, Fraser & Bonnett

N. PETERS. Photo-Lithographer, Washington, D. C.

UNITED STATES PATENT OFFICE.

EDWARD B. HART, OF STRANDTOWN, BELFAST, IRELAND.

EXTRACTING BY VOLATILE SOLVENTS SOLUBLE MATTER FROM SUBSTANCES CONTAINING IT, AND APPARATUS THEREFOR.

SPECIFICATION forming part of Letters Patent No. 253,379, dated February 7, 1882.

Application filed September 2, 1881. (No model.)

*To all whom it may concern:*

Be it known that I, EDWARD BUNTING HART, of Strandtown, Belfast, Ireland, gentleman, have invented certain new and useful Improvements in Extracting by Volatile Solvents Soluble Matter from Substances Containing it, and in Apparatus therefor, of which the following is a specification.

My invention has reference to an improved method of extracting by volatile solvents soluble matter from substances containing it—such, for example, as oil from seeds, fats from animal matters, sulphur from hydrated peroxide of iron or from other material containing it, oil from anthracene, and resins or gums from vegetable matters. Prior to my invention such extraction has been effected by placing the material to be acted on in a closed vessel on a foraminous plate arranged therein to divide the vessel horizontally into upper and lower compartments, the solvent liquid has been introduced into the lower compartment, heat has been applied to said compartment, the solvent has been vaporized thereby, and its vapor has passed up through the mass of material on the plate, a portion thereof has been condensed by contact with the cooler surface of the top of the vessel, and what has escaped being thus condensed has passed off through a pipe to a condenser, been there condensed, and has flowed back and fallen on the mass of material, after which it has been again vaporized; and the process has been continued until the desired extraction was effected. I regard this process as defective, in that it does not cause a sufficiently active circulation of the solvent through the material under treatment, the condensation of the vapor within the extracting-vessel being only partial, the superior pressure in the lower compartment being uniformly maintained, and consequently obstructing the flow of the condensed solvent downward through the material, and the solvent returning from the condenser being poured always upon one portion of the material. The result is a slow and unequal process. My invention is designed to overcome these disadvantages, and my process differs from that heretofore followed in that the solvent vapors are condensed within the extracting-vessel, dropping thence uniformly over the surface of the material under treatment, and the pressure in the lower compartment is maintained for a while sufficiently greater than that above the material to prevent the condensed solvent from falling through the material, thereby retaining it therein and boiling it with the material for a longer or shorter time, and then the relative pressures in the two compartments are altered, so as to neutralize the superior pressure in the lower compartment, thereby causing the condensed solvent to flow down through the material and fall into the lower compartment, after which the pressure below is again made greater than that above, and the process is repeated as many times as may be necessary to effect the extraction.

Figure 2:
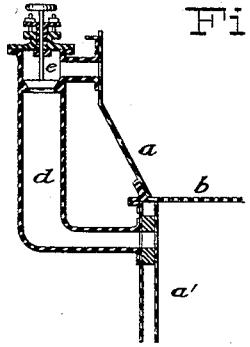

In the accompanying drawings, Figure 1 is a vertical mid-section of an apparatus for carrying my invention into effect. Fig. 2 is a section taken at right angles to Fig. 1, showing the pipe or connection between the two compartments of the extractor, as hereinafter described.

I employ as the extractor a vessel such as that shown, divided into upper and lower compartments, $a$ $a'$, by a filter-plate, B. The top of the vessel is closed by a double or jacket lid, $c$, through which cold water is caused to flow as required. The under plate of this lid is grooved or roughened, as indicated, in such a way as will cause the condensed solvent to fall evenly from all the surface. The lid $c$ is fastened to the top of the vessel $a$ by bolts, a packing-ring being inserted to make an air-tight joint. The lower compartment, $a'$, is jacketed, and the two compartments $a$ $a'$ communicate with each other by means of a side pipe, $d$, (see Fig. 2,) fitted with a valve, $e$, or other closing device.

Below the filter-bed $b$ is a spout or gutter, $f$, to catch a sample of the liquid falling through the bed and discharge it into a test-cock, $g$.

From the compartment $a$ a pipe, $i$, leads to a condenser or otherwise, and from the lower compartment, $a'$, another pipe, $l$, leads to the source from which the solvent is supplied. These pipes $i$ and $l$ are each fitted with a cock, (marked $m$ and $n$, respectively.)

$s$ is a pipe for admitting water or steam into the jacket of the lower compartment, $a'$; or, instead of the jacket, a worm may be placed in the compartment $a'$; or other means of heating this compartment may be adopted.

$t$ is a cock to run out the extracted matter from the lower compartment.

The method of working is as follows: The substance to be operated on is spread on the filter-bed *b* of the extractor to such a depth as may be found suitable, varying from twelve to twenty-four inches, more or less. The lid *c* is then put on and bolted down, the packing-ring making an air-tight joint. The cock *m* in the pipe *i* is opened to allow the air in the extractor to escape, and the cock *n* in the pipe *l* is opened to allow the solvent to run into the lower compartment, *a'*. Steam is then turned into the jacket of the lower compartment by the pipe *s*. As soon as all the air has been expelled from the extractor the cock *m* is closed, and also the valve *e* in the pipe *d*. Cold water is now caused to flow through the lid *c* to condense the vapor. The extractor being now completely closed, the vapor generated from the solvent rises through the substance on the filter-bed *b* and is condensed, partly by the substance and partly by the lid *c*. The pressure generated in the lower compartment, *a'*—generally one to two pounds—prevents this condensed solvent falling. It therefore accumulates in the substance on the filter-bed, and is kept boiling there by the vapor below. When it has been sufficiently boiled the valve *e* in the pipe *d* is opened. The pressure being thus equalized, the liquid solvent passes down through the filter-bed *b*, carrying with it what it has dissolved.

The above process may be repeated as often as may be desired by alternately closing and opening the pipe *d;* or the extraction may be effected by putting in a limited supply of the solvent. This boils up, as before described. When it is all up the pressure below is no longer maintained, and the solvent falls, to boil up afresh, and so completes the extraction.

The solvent may be caused to fall by any means that will destroy or neutralize the pressure below, such as stopping the boiling, cooling the liquid or vapor by water, or in any way increasing the pressure in the upper compartment. All that is necessary is to produce within the extractor equal pressures above and below the filter-bed and the solvent will fall. When the boiling is completed the pipe *d* is left open, so that the vapor will rise through it, become condensed on the lid *c*, and fall in a shower on the substance under treatment, and pass down through it, and this operation is continued until all the soluble matter has been extracted, as can be ascertained by the test-cock *g*.

The solvent which remains in the bottom of the extractor may either be evaporated or be run off into a suitable receiver, as may be most convenient.

For recovering the solvent which remains in the substance operated on I employ by preference the method or process which forms the subject of another application for patent, of even date herewith.

What I claim, and desire to secure by Letters Patent, is—

1. The improved process of extracting soluble matters by volatile solvents in a closed vessel divided horizontally by a filter-plate, which consists in placing the material containing the soluble matter on said filter-plate, placing the solvent in the lower compartment of the vessel, below said plate, applying sufficient heat to said lower compartment to vaporize the solvent, thereby causing its vapor to ascend and permeate the material, and in part to pass through the same and ascend into the upper compartment, cooling the surface of the upper compartment sufficiently to condense the vapor that comes in contact therewith, thereby causing the same to fall back on the material, maintaining for a while a pressure in the lower compartment sufficiently in excess of that in the upper compartment to prevent the condensed solvent falling from the material into the lower compartment, thereby retaining it in the material and boiling it therein, and finally equalizing the pressure in the two compartments or otherwise neutralizing or overcoming the superior pressure in the lower compartment, thereby causing the condensed solvent to flow downward through the material and fall into the lower compartment, all substantially as set forth.

2. An apparatus for extracting soluble matter by volatile solvents, consisting of the combination of a closed vessel, a filter-plate arranged horizontally therein and dividing it into two compartments, a steam-jacket around the lower compartment, or equivalent means of applying heat thereto, a condensing-jacket formed as the top of the upper compartment, the lower or condensing plate thereof being flat, level, and uniformly roughened or corrugated to cause the vapor condensed upon it to drop from the portion of the plate on which it is condensed, thereby insuring a uniform fall of condensed vapor from all parts of the plate, and means for equalizing at will the pressures in the two compartments, substantially as set forth.

3. An apparatus for extracting soluble matters by volatile solvents, consisting of the combination of a closed vessel, a horizontal filtering-plate, *b*, dividing said vessel into an upper compartment, *a*, and a lower compartment, *a'*, a steam-jacket surrounding the compartment *a'*, or equivalent means of applying heat thereto, a condenser, *c*, arranged as the top of the compartment *a*, a pipe or passage, *d*, connecting the two compartments, and a valve, *e*, in said pipe, substantially as set forth.

In witness whereof I have hereunto signed my name in the presence of two subscribing witnesses.

EDWARD B. HART.

Witnesses:
 JOHN WHITE,
  168 *York St., Belfast.*
 SAMUEL COURTNEY,
  11 *Bryson St., Belfast.*